United States Patent Office 3,647,873
Patented Mar. 7, 1972

3,647,873
NUCLEAR SULFONYL SUBSTITUTED N-ACYL-BENZENESULFONAMIDES
Carl Ziegler, Glenside, and James M. Sprague, Gwynedd Valley, Pa., assignors to Merck & Co., Inc., Rahway, N.J.
No Drawing. Filed Feb. 3, 1970, Ser. No. 8,413
Int. Cl. C07c
U.S. Cl. 260—556 AC                7 Claims

ABSTRACT OF THE DISCLOSURE

Nuclear sulfonyl substituted N-acyl-(and N-organosulfonyl)benzenesulfonamides and salts thereof, wherein the benzene ring may be substituted by halo, lower alkyl, trihalomethyl, nitro, carboxy or a hydrocarbylene moiety. The products are prepared by treating a nuclear sulfonyl substituted benzenesulfonamide with an acyl(or organosulfonyl)halide or with a carboxylic acid (or organosulfonic acid)anhydride. The nuclear sulfonyl substituted N-acyl(and N-organosulfonyl)-benzenesulfonamides are uricosuric agents useful in the treatment of gout and gouty arthritis.

This invention relates to a new class of chemical compounds which can be described generally as nuclear sulfonyl substituted N-acyl- (and N-organosulfonyl)benzenesulfonamides and salts thereof. It is also an object of this invention to describe novel methods for the preparation of the nuclear sulfonyl substituted N-acyl- (and N-organosulfonyl)benzenesulfonamides.

Pharmacological studies show that the instant products are effective uricosuric agents which can be used in the treatment of gout and gouty arthritis by increasing the excretion of uric acid by the kidney. The instant products are also a valuable adjuvant for inhibiting the excretion of penicillin, thus maintaining high antibiotic levels in the treatment of conditions that require intensive penicillin therapy.

The nuclear sulfonyl substituted N-acyl- (and N-organosulfonyl)benzenesulfonamides of this invention are compounds having the following structural formula:

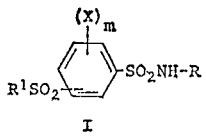

I wherein R is alkanoyl, for example, lower alkanoyl such as acetyl, n-propionyl, n-butyryl, isobutyryl, pentanoyl and the like, cycloalkylcarbonyl, for example, cycloalkylcarbonyl containing from 5–6 nuclear carbon atoms such as cyclopentylcarbonyl, cyclohexylcarbonyl and the like, cycloalkylalkanoyl, for example, mononuclear cycloalkyl substituted lower alkanoyl containing 5–6 nuclear carbon atoms such as cyclopentylacetyl, cyclohexylacetyl and the like, alkenoyl, for example, lower alkenoyl such as 2-butenoyl and the like, alkynoyl, for example, lower alkynoyl such as 2-butynoyl and the like, aroyl, for example, mononuclear aroyl such as benzoyl and the like, aralkanoyl, for example, mononuclear lower aralkanoyl such as phenylacetyl and the like, lower alkanesulfonyl such as methanesulfonyl and the like or a 5- or 6-membered heterocyclic substituted carbonyl or a 5- or 6-membered heterocyclic substituted lower alkanoyl in which the heterocycle contains a single hetero atom selected from oxygen, nitrogen, or sulfur such as 2-furancarbonyl, 2-pyrrolidinecarbonyl, 2-pyridinecarbonyl, 2-piperidinecarbonyl, 2-pyridineacetyl, 2-piperidineacetyl, 2-furanacetyl, 2-thiophenecarbonyl and the like; $R^1$ is alkyl, for example, alkyl containing from two to nine carbon atoms such as ethyl, n-propyl, n-butyl, pentyl, hexyl, 4-heptyl, 5-nonyl and the like; cycloalkyl, for example, mononuclear lower cycloalkyl containing from 5 to 6 nuclear carbon atoms such as cyclopentyl, cyclohexyl and the like, alkenyl, for example, lower alkenyl such as 2-butenyl and the like, alkynyl, for example, lower alkynyl such as 2-butynyl and the like or a 5- or 6-membered heterocycle containing a single hetero atom selected from oxygen or nitrogen or sulfur such as 2-furyl, 2-pyrrolidinyl, 2-pyridyl, 2-thienyl and the like; X is halo, for example, bromo, chloro, fluoro, iodo and the like, lower alkyl such as methyl, ethyl, n-propyl and the like, nitro, trihalomethyl such as trifluoromethyl and the like or carboxy or, taken together, two X radicals on adjacent carbon atoms of the benzene ring may be joined to form a hydrocarbylene chain containing from 3 to 4 carbon atoms between their points of attachment as, for example, a trimethylene, tetramethylene or 1,3-butadienylene (i.e., —CH=CH—CH=CH—) chain and $m$ is an integer having a value of 0–4; and the non-toxic, pharmaceutically acceptable salts thereof as, for example, organic and inorganic salts derived from alkali metal and alkaline earth metal bases such as sodium hydroxide, sodium bicarbonate, calcium carbonate, magnesium hydroxide and the like or salts derived from ammonia or from dialkylamines or heterocyclic amines such as dimethylamine, diethylamine, piperidine, pyrrolidine, pyridine, morpholine and the like.

A preferred embodiment of this invention relates to N-lower alkanoyl sulfonylbenzenesulfonamides having the following structural formula:

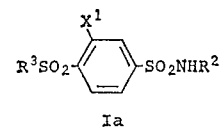

Ia wherein $R^2$ is lower alkanoyl such as acetyl and the like; $R^3$ is an alkyl radical containing from 7 to 9 carbon atoms and $X^1$ is hydrogen or halo; and the alkali metal and alkaline earth metal salts thereof. This class of compounds exhibits particularly good uricosuric activity and represents a preferred subgroup of compounds within the scope of this invention.

The nuclear sulfonyl substituted N-acyl (and N-organosulfonyl)benzenesulfonamides of this invention are conveniently prepared by the reaction of a sulfonylbenzenesulfonamide (II, infra) with ether an acyl (or organosulfonyl)halide or with a carboxylic acid anhydride or with an organosulfonic acid anhydride. When an acyl (or organosulfonyl)halide is employed, the sulfonylbenzenesulfonamide may be converted to its alkali metal salt by treatment with an alkali metal base such as sodium hydride and the like. The use of the salt permits the use of a stoichiometric amount of an acyl (or organosulfonyl)halide resulting in a simpler isolation of the product because the acyl halide is completely utilized and eliminates the necessity of removing any excess. However, it is to be understood that identical results may be obtained by employing the sulfonylbenzenesulfonamide per se absent any salt derivative. When a carboxylic (or organosulfonic)acid anhydride is used as the reactant, it is preferable to add a small amount of a strong inorganic acid such as sulfuric acid, as a catalyst. The reaction may be conducted in a temperature range of from about 20° C. to about 100° C. Any solvent in which the reactants are soluble and substantially inert to the reactants may be employed, for example, hydrocarbons such as benzene, toluene and the like, tertiary amines, for example, trialkylamines and heterocyclic amines such as trimethylene, pyridine and the like. Also, in addition to the foregoing, an excess of the acyl halide or carboxylic acid anhydride which is employed as a reactant in the process may be used as the diluent; however, when an organosulfonyl halide is employed, it is advisable to add a small amount of a tertiary amine to the reaction mixture. The following equation, which describes the use of a carboxylic (or alkanesulfonic) acid halide, illustrates this process; however, it is to be understood that by substituting the corresponding known carboxylic (or alkanesulfonic) acid anhydride, similar products may be obtained.

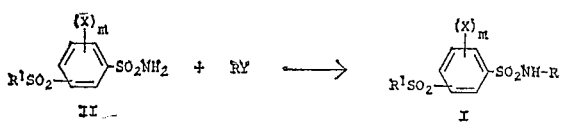

wherein R, $R^1$, X and m are as defined above and Y is halo such as bromo, chloro, fluoro and the like.

The sulfonylbenzenesulfonamide (II, supra) employed as the starting material in the preparation of the nuclear sulfonyl substituted N-acyl (and N-organosulfonyl)benzenesulfonamides (I, supra) is prepared by the treatment of a sulfonylbenzenesulfonyl halide (III, infra) with ammonia. The following equation illustrates this process:

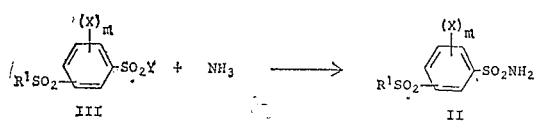

wherein $R^1$, X, Y and m are as defined above.

The sulfonylbenzenesulfonyl halides (III, supra) employed as starting materials in the preparation of the sulfonylbenzenesulfonamides (II, supra) may be prepared by the diazotization of an appropriate sulfonylaniline (IV, infra). The sulfonylaniline is dissolved in a solution of glacial acetic acid and concentrated hydrochloric acid and is then converted to its corresponding diazonium salt by treatment with an aqueous solution of sodium nitrite. The dazonium salt (V, infra) is treated with a glacial acetic acid solution of sulfur dioxide, a cuprous halide, such as cuprous chloride, cuprous bromide or cuprous fluoride and water. The reaction may be conducted at temperatures from about 0° C. to 25° C., but it is preferred to conduct the process at 15° C. The following equation illustrates this process:

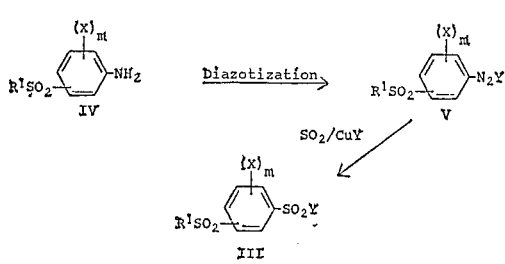

wherein $R^1$, X, $X^3$, Y and m are as defined above.

The sulfonylanilines (IV, infra) employed as intermediates in the preparation of the sulfonylbenzenesulfonyl halides (III, supra) are prepared by hydrolyzing an appropriate N-lower alkanoyl (sulfonyl) aniline (VI, infra) via treatment with an aqueous solution of an inorganic acid such as hydrochloric acid and the like or, alternatively, with an aqueous solution of a base as, for example, with an alkali metal hydroxide such as sodium hydroxide, potassium hydroxide and the like.

The following equation illustrates this process:

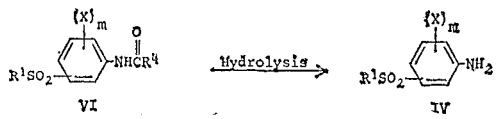

wherein $R^1$, X and m are as defined above and $R^4$ is lower alkyl such as methyl, ethyl, n-propyl and the like.

The N-lower alkanoyl (sulfonyl) anilines (VI) are prepared by treating the corresponding N-lower alkanoyl (sulfinyl) aniline (VII, infra) with an oxidizing agent. The following equation illustrates this process:

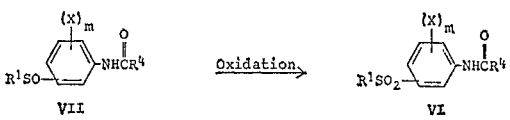

wherein $R^1$, $R^4$, X and m are as defined above. Alternatively, in lieu of the N-lower alkanoyl(sulfinyl)aniline precursor (VII) it is also possible to employ as a reactant in this process the corresponding N-lower alkanoyl nuclear thio substituted aniline (VIII, infra). According to this method of preparation, the N-lower alkanoyl thioaniline reactant (VIII) is first oxidized to the corresponding N-lower alkanoyl(sulfinyl)aniline derivative (VII) and then to the desired N-lower alkanoyl(sulfonyl)aniline (VI). If it is desired to isolate the N-lower alkanoyl(sulfinyl)aniline derivative (VII) the N-lower alkanoyl thioaniline (VIII) is treated with a stoichiometric amount of oxidizing agent and the N-lower alkanoyl(sulfinyl)aniline thus obtained may be removed by filtration and, if desired, may be purified by recrystallization from a suitable solvent such as ethanol. The following equation illustrates this two-step process:

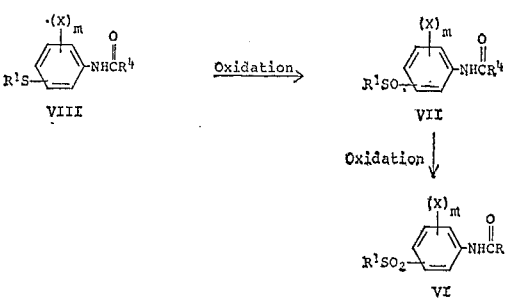

wherein $R^1$, $R^4$, X and m are as defined above. Oxidizing agents which are suitable for use in both oxidation steps include, for example, hydrogen peroxide, chromium trioxide, potassium permanganate and the like. The oxidation reaction may be conducted in any solvent in which the reactants are reasonably soluble and substantially inert. Suitable solvents include acetic acid, acetone and the like. Temperature is not particularly critical to the success of the reaction and, in general, temperatures in the range from about 0° to about 100° C. are suitable; however, it is usually convenient to conduct the reaction at temperatures in the range from about 0° C. to room temperature and preferably in an ice bath at about 0° C.

The N-lower alkanoyl thioanilines (VIII, infra) are conveniently prepared by treating an alkali metal derivative of an N-lower alkanoyl nuclear mercapto substituted aniline (IX, infra) with a compound of the formula: $YR^1$ wherein $R^1$ and Y are as defined above. Any solvent in which the reactants are soluble and which are inert to the reactants employed may be used, such as ethanol, benzene, toluene and the like. While the temperature at which the reaction is conducted is not a particularly critical aspect of this invention, it is convenient to conduct the reaction at temperatures ranging from ambient temperature up to the reflux temperature of the particular solvent employed. The following equation illustrates this process:

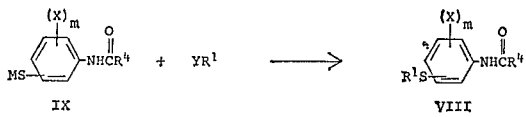

wherein $R^1$, $R^4$, X, Y and $m$ are as defined above and M is a cation derived from an alkali metal such as sodium and the like.

The alkali metal salts of the N-lower alkanoylmercaptoanilines (IX, supra) employed in the preparation of the N-lower alkanoyl thioanilines (VIII, supra) are conveniently prepared by treating the corresponding N-lower alkanoyl mercaptoaniline (X, infra) with a base such as an alkali metal alkoxide or an alkali metal hydride such as sodium ethoxide, sodium hydride and the like. When an alkoxide is employed, it is convenient to employ, as a solvent, an alkanol which corresponds to the alkoxide portion of the alkali metal alkoxide, whereas, when an alkali metal hydride is employed hydrocarbon solvents such as benzene, toluene and the like are preferred. This reaction is conveniently conducted at the reflux temperature of the particular solvent employed. The following equation illustrates this process:

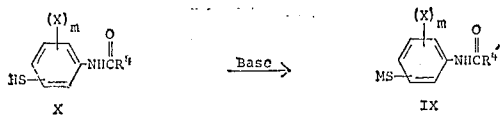

wherein $R^4$, M, X and $m$ are as defined above.

The N-lower alkanoyl mercaptoanilines (X, supra) employed in the preparation of the alkali metal salts of the N-lower alkanoyl mercaptoanilines (IX, supra) are either known compounds or are prepared by treating a suitable N-lower alkanamidobenzenesulfonyl halide (XI, infra) with a reducing agent such as zinc amalgam, zinc dust or stannous chloride. The reaction is preferably conducted in an aqueous solution of a mineral acid such as hydrochloric acid, sulfuric acid and the like or in a lower alkanoic acid such as acetic acid. The following equation illustrates this process:

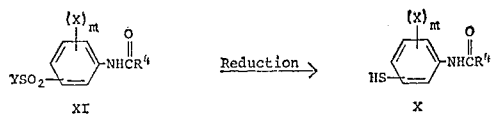

wherein $R^4$, X, Y and $m$ are as defined above.

The N-lower alkanamidobenzenesulfonyl halides (XI, supra) employed as a starting material in the preparation of the N-lower alkanoyl mercaptoanilines (X) are either known compounds or may be prepared by treating the corresponding anilide (XII, infra) with a halosulfonic acid such as chlorosulfonic acid, fluosulfonic acid and the like. This reaction is conducted by adding the anilide to the halosulfonic acid at a temperature in the range of from 15° to ambient temperature and when the addition is complete, warming the reaction mixture to complete the reaction. The following equation illustrates this process:

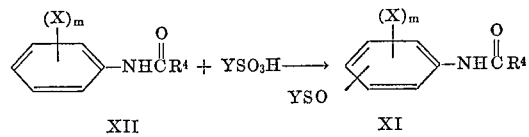

wherein $R^4$, X, Y and $m$ are as defined above.

Included within the scope of this invention are the non-toxic, pharmaceutically acceptable salts of the instant products. In general, any base which will form a salt with the foregoing nuclear sulfonyl substituted N-acyl (and N-organosulfonyl)benzenesulfonamides and whose pharmacological properties will not cause an adverse physiological effect when ingested by the body system is considered as being within the scope of this invention. Suitable bases include, for example, the alkali metal and alkaline earth metal hydroxides, carbonates and alkoxides, ammonia, secondary amines, heterocyclic amines and the like.

The examples which follow illustrate the nuclear sulfonyl substituted N-acyl(and N-organosulfonyl)benzenesulfonamides (I) of this invention and the methods by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

N-acetyl-4-(4-heptylsulfonyl)benzenesulfonamide

Step A: N-acetylsulfanilyl chloride.—To a cooled solution (12°–15° C.) of chlorosulfonic acid (290.0 g., 2.49 mole) is slowly added acetanilide (67.5 g., 0.05 mole). After the addition is complete the mixture is heated to 60° C. for two hours. The reaction mixture is poured into 1 kg. of ice. The crude N-acetylsulfanilyl chloride is collected on a suction funnel and washed with water. Recrystallization from benzene affords substantially pure N-acetylsulfanilyl chloride, M.P. 149° C.

Step B: 4-acetamidothiophenol.—To a suspension of N-acetylsulfanilyl chloride (5.5 g., 0.25 mole) in sulfuric acid (concentrated, 300 ml.) and water (600 ml.) is added zinc amalgam. [The zinc amalgam is prepared by dissolving chloride (28.0 g.) in a solution of water (200 ml.) and concentrated hydrochloric acid (20 ml.) followed by the addition of zinc dust (150.0 g., 2.3 mole). The reaction mixture is stirred for ¼ hour and then the zinc amalgam is collected by filtration. The zinc amalgam is washed successively with water, ethanol and finally, ether.] Benzene (300 ml.) is added to the reaction mixture and the reaction mixture is refluxed, on a steam bath, for 1¼ hours. The reaction mixture is cooled and the benzene layer separated from the aqueous phase. The aqueous phase is extracted with four 500 ml. portions of diethyl ether. The benzene layer and the diethyl ether extracts are combined and dried over sodium sulfate, filtered and the solvent removed to afford 4-acetamidothiophenol, M.P. 150–153° C.

Step C: 4-(4-heptylthio)acetanilide.—Sodium (9.2 g., 0.4 g. atom) is dissolved in ethanol (40 ml.). To this solution is added 50 g. (0.3 mole) of 4-acetamidothiophenol after which the reaction mixture is heated under reflux for half an hour. 4-bromoheptane (59.2 g., 0.33 mole) is added as rapidly as the reaction would allow. The reaction mixture is then heated for 5 hours. The excess alcohol is removed and water is added to the residue. The oily product is extracted into ether, the extract is dried over sodium sulfate and the crude 4-(4-heptylthio)-acetanilide is distilled. The fraction that boils between 170° and 175° C. at 0.4 mm. of mercury is collected.

Step D: 4-(4-heptylsulfonyl)acetanilide.—A solution of 27.5 g. (0.104 mole) of 4-(4-heptylthio)acetanilide in a mixture of 125 ml. of glacial acetic acid and 125 ml. of acetic anhydride is cooled to 0° C. and 39 g. (0.39 mole) of 30% hydrogen peroxide is added slowly, dropwise, with good stirring at such a rate that the temperature remains below 5° C. The reaction is allowed to come to room temperature as the ice bath melts. After diluting the reaction with a liter of water, the oily material is extracted into ether and the extract dried over sodium sulfate. The sodium sulfate is removed by filtration and the filtrate is concentrated and chilled to afford 4-(4-heptylsulfonyl)acetanilide which, after several recrystallizations from ether, has an M.P. of 113°–114° C.

Elemental analysis for $C_{15}H_{23}NO_3S$.—Calc. (percent): C, 60.58; H, 7.79; N, 4.71. Found (percent): C, 61.14; H, 7.49; N, 4.69.

Step E: 4-(4-heptylsulfonyl)aniline.—A solution of 4-(4-heptylsulfonyl)acetanilide (45 g.) in ethanol (150 ml.), concentrated hydrochloric acid (100 ml.) and water (100 ml.) is heated under reflux for 48 hours. After concentrating to a small volume on the steam bath, the reaction mixture is diluted to about 2 liters with cold water. The resulting white precipitate is filtered and dried, yielding 36 g. of 4-(4-heptylsulfonyl)aniline, M.P. 144°–145° C. unchanged by recrystallization from ether.

Elemental analysis for $C_{13}H_{21}NO_2S$.—Calc. (percent): C, 61.14; H, 8.29; N, 5.48. Found (percent): C, 61.13; H, 8.19; N, 5.58.

Step F: 4 - (4-heptylsulfonyl)benzenesulfonyl chloride.—A slurry of 4-(4-heptylsulfonyl)aniline (8 g., 0.03 mole) in glacial acetic acid (27 ml.) and concentrated hydrochloric acid (22 ml.) is cooled to 0° C. in an ice-salt bath and stirred vigorously while 2.2 g. (0.03 mole) of sodium nitrite in 10 ml. of water is added slowly, dropwise, at such a rate that the temperature never exceeds 5° C. While this is being done, a solution of sulfur dioxide (16.5 g.) in acetic acid (35 ml.) is prepared. To this is added cupric chloride (2.2 g.) in water (6 ml.). When the diazotization is complete, the reaction mixture is added carefully to the sulfur dioxide solution as fast as foaming allows. After standing for 2 hours, the reaction is diluted to one liter with water and filtered. The residue is air dried to yield 9 g. of crude product, M.P. 96°–99° C. It can be recrystallized from a mixture of ether and petroleum ether to afford pure 4-(4-heptylsulfonyl)benzenesulfonyl chloride, M.P. 102°–103° C.

Elemental analysis for $C_{13}H_{19}ClO_4S_2$.—Calc. (percent): C, 46.08; H, 5.65. Found (percent): C, 46.25; H, 5.62.

Step G: 4-(4-heptylsulfonyl)benzenesulfonamide.—4-(4-heptylsulfonyl)benzenesulfonyl chloride (4.0 g.) is added to ammonium hydroxide (100 ml., 28%) to yield crude-4-(4-heptylsulfonyl)benzenesulfonamide. The product is collected and recrystallized from benzene to yield substantially pure 4 - (4 - heptylsulfonyl)benzenesulfonamide, M.P. 156°–157° C.

Elemental analysis for $C_{13}H_{21}NO_4S_2$.—Calc. (percent): C, 48.88; H, 6.63; N, 4.38. Found (percent): C, 49.35; H, 6.68; N, 4.38.

Step H: N-acetyl-4-(4-heptylsulfonyl)benezenesulfonamide.—To a suspension of sodium hydride (0.95 g., 0.04 mole) in dry benzene (500 ml.) is added 4-(4-heptylsulfonyl)benzenesulfonamide (12.5 g., 0.04 mole). The reaction mixture is heated on the steam bath for ½ hour. Acetyl chloride (3.1 g., 0.04 mole) is added and the heating is continued for 2 hours. The reaction mixture is cooled and the product extracted into a sodium bicarbonate solution. Careful acidification with dilute hydrochloric acid affords N-acetyl-4-(4-heptylsulfonyl)benzenesulfonamide which is recrystallized from benzene to afford substantially pure product, M.P. 126°–128° C.

Elemental analysis for $C_{15}H_{23}NO_5S_2$.—Calc. (percent): C, 49.84; H, 6.41; N, 3.88. Found (percent): C, 50.43; H, 6.06; N, 4.03.

By substituting for the acetyl chloride of Example 1, Step H, an equimolar quantity of n-propionyl chloride, n-butyryl chloride, cyclopentylacetyl chloride or cyclohexylacetyl chloride and, by following substantially the procedure described therein, there is obtained, respectively, N-n-propionyl-4-(4-heptylsulfonyl)benzenesulfonamide, N-n-butyryl-4-(4 - heptylsulfonyl)benzenesulfonamide, N-cyclopentylacetyl-4-(4-heptylsulfonyl)benzenesulfonamide and N-cyclohexylacetyl-4-(4-heptylsulfonyl)benzenesulfonamide.

EXAMPLE 2

N-acetyl-3-chloro-4-(4-heptylsulfonyl)benzenesulfonamide

Step A: N-acetyl-2-chlorosulfanilyl chloride.—3-chloroacetanilide (0.5 mole) is slowly added to chlorosulfonic acid (330 ml.). After the addition is completed the reaction mixture is heated to 60°–65° C. for 2 hours, the solution is then cooled and poured onto crushed ice to yield crude N-acetyl-2-chlorosulfanilyl chloride, M.P. 138°–140° C.

Step B: 4-acetamido-2-chlorothophenol.—Sulfuric acid (300 ml., concentrated) is added to cold water (600 ml.) and the solution is cooled to room temperature. A solution of mercuric chloride (28.0 g.) in water (200 ml.) and concentrated hydrochloric acid (20.0 ml.) is prepared. To this solution is added powdered zinc (200.0 g.), with occasional stirring to break up the lumps. The zinc amalgam formed is collected on a suction funnel and washed successsively with water, alcohol and ether. A mixture of the zinc amalgam (67.0 g.), N-acetyl-2-chlorosulfanilyl chloride and benzene (300 ml.) is added to the sulfuric acid solution and the mixture is carefully heated under reflux, with good stirring, until the reaction became vigorous. After the initial reaction had subsided, the mixture is heated on the steam bath for 2 hours. The mixture is then cooled and extracted with four 500 ml. portions of ether. The extract is dried over sodium sulfate, filtered and concentrated to a small volume whereupon there is obtained 25 g. of 4-acetamido-2-chlorothiophenol, M.P. 119°–121° C.

Elemental analysis for $C_8H_8ClNOS$.—Calc. (percent): C, 47.64; H, 4.00. Found (percent): C, 48.00; H, 4.80.

Step C: 3-chloro-4-(4-heptylthio)acetanilide.—Sodium (9.2 g., 0.4 g. atom) is dissolved in ethanol (400 ml.). To this solution is added 4-acetamido-2-chlorothiophenol (0.03 ml.), the reaction mixture is then heated under reflux for ½ hour. 4-Bromoheptane (59.2 g., 0.33 mole) is added as rapidly as the reaction would allow. The reaction mixture is then heated for 5 hours. The excess ethanol is removed and water is added to the residue. The oily product is extracted into ether. The extract is dried over sodium sulfate. The solution is filtered and the ether is removed to yield 3-chloro-4-(4-heptylthio)acetanilide.

Step D: 3-chloro-4-(4-heptylsulfonyl)acetanilide.—A solution of 3-chloro-4-(4-heptylthio)acetanilide (0.0104 mole) in a mixture of glacial acetic acid (125.0 ml.) and acetic anhydride (125.0 ml.) is cooled to 0° C. and 39 g. (0.39 mole) of 30% hydrogen peroxide is added slowly, dropwise, with good stirring at such a rate that the temperature remains below 5° C. The reaction mixture is allowed to come to room temperature as the ice bath melts. After diluting the reaction mixture with a liter of water, the oily material is extracted into ether and the extract dried over sodium sulfate. The sodium sulfate is removed by filtration and the ether removed to afford 3-chloro-4-(4-heptylsulfonyl)acetanilide, M.P. 95°–97° C. after several recrystallizations from ether.

Elemental analysis for $C_{15}H_{22}ClNO_3S$.—Calc. (percent): C, 54.28; H, 6.68; N, 4.22. Found (percent): C, 53.99; H, 6.35; N, 4.53.

Step E: 3-chloro-4-(4-heptylsulfonyl)aniline.—A solution of 3-chloro-4-(4-heptylsulfonyl)acetanilide (45.0 g.) in ethanol (150 ml.), concentrated hydrochloric acid (100 ml.) and water (100 ml.) is heated under reflux for 48 hours. After concentrating to a small volume on the steam bath, the reaction mixture is diluted to about 2 liters with cold water to afford 3-chloro-4-(4-heptylsulfonyl)aniline, M.P. 178°–180° C.

Elemental analysis for $C_{13}H_{20}ClNO_2S$.—Calc. (percent): C, 53.87; H, 6.96; N, 4.83. Found (percent): C, 53.99; H, 6.65; N, 4.80.

Step F: 3-chloro-4-(4-heptylsulfonyl)benzenesulfonyl chloride.—By substituting for the 4-(4-heptylsulfonyl) aniline of Example 1, Step F, an equimolar quantity of 3-chloro-4-(4-heptylsulfonyl)aniline and by following substantially the procedure described therein, there is obtained 3-chloro-4-(4-heptylsulfonyl)benzenesulfonyl chloride.

Step G: 3 - chloro-4-(4 - heptylsulfonyl)benzenesulfonamide.—By substituting for the 4-(4-heptylsulfonyl)benzenesulfonyl chloride of Example 1, Step G, an equimolar quantity of 3-chloro-4-(4-heptylsulfonyl)benzenesulfonyl chloride and by following the procedure described therein, there is obtained 3-chloro-4-(4-heptylsulfonyl)benzenesulfonamide which, after recrystallization from a mixture of benzene and hexane, has an M.P. of 146°–148° C.

Element analysis for $C_{13}H_{20}ClNO_4S_2$.—Calc. (percent): C, 44.12; H, 5.70; N, 3.96. Found (percent): C, 44.42; H, 5.67; N, 3.93.

Step H: N-acetyl - 3 - chloro-4-(4-heptylsulfonyl)benzenesulfonamide.—By substituting for the 4-(4-heptylsulfonyl)benzenesulfonamide of Example 1, Step H, an equimolar quantity of 3- chloro-4-(4-heptylsulfonyl)benzenesulfonamide and by following the procedure described therein, there is obtained N-acetyl-3-chloro-4-(4-heptylsulfonyl)benzenesulfonamide which, after recrystallization from ether/petroleum ether, has a M.P. of 141°–143° C.

Elemental analysis for $C_{15}H_{22}ClNO_5S_2$.—Calc. (percent): C, 45.50; H, 5.60; N, 3.54. Found (percent): C, 45.40; H, 5.57; N, 3.59.

By substituting for the acetyl chloride of Example 2, Step H, an equimolar quantity of cyclopentylcarbonyl chloride, cyclohexylcarbonyl chloride, 2-butenoyl chloride or 2-butynoic acid chloride and, by following substantially the procedure described therein, there is obtained, respectively, N-cyclopentylcarbonyl-3-chloro-4-(4-heptylsulfonyl) benzenesulfonamide,
N-cyclohexylcarbonyl-3-chloro-4-(4-heptylsulfonyl) benzenesulfonamide,
N-(2-butenoyl)-3-chloro-4-(4-heptylsulfonyl) benzenesulfonamide and
N-(2-butynoyl)-3-chloro-4-(4-heptylsulfonyl) benzenesulfonamide.

EXAMPLE 3

N-acetyl-3-chloro-4-(5-nonylsulfonyl) benzenesulfonamide

Step A: 3-chloro - 4 - (5-nonylthio)acetanilide.—Sodium (4.6 g., 0.2 g. atom) is dissolved in ethanol (150 ml.). To this solution is added 4-acetamido-2-chlorothiophenol (54.0 g., 0.27 mole). The reaction mixture is refluxed for 15 minutes and 5-bromononane is then added slowly dropwise. The reaction mixture is heated to reflux for 2 hours and then the ethanol removed by distillation. The residual oil is treated with water and acetic acid and then extracted with ether. The ether solution is dried over sodium sulfate and then filtered. Removal of the solvent affords 3-chloro-4-(5-nonylthio)acetanilide as a yellow oil.

Step B: 3-chloro - 4 - (5 - nonylsulfonyl)acetanilide.—3-chloro-4-(5-nonylthio)acetanilide (51 g.) is dissolved in a mixture of acetic acid (100 ml.) and acetic anhydride (100 ml.). The reaction mixture is cooled in an ice bath and hydrogen peroxide (60 g.) added dropwise. The reaction mixture is allowed to stand overnight at room temperature and is then heated on the steam bath for ½ hour. The reaction mixture is poured onto ice whereupon 3-chloro-4-(5-nonylsulfonyl)acetanilide is obtained as a yellow oil.

Step C: 3-chloro - 4 - (5-nonylsulfonyl)aniline.—3-chloro-4-(5-nonylsulfonyl)acetanilide is dissolved in ethanol (200 ml.). Hydrochloric acid (6 N, 150 ml.) is added and the reaction mixture is heated on the steam bath for 2 hours. The reaction mixture is cooled and sufficient ammonia to basify the reaction mixture is added whereupon 3-chloro-4-(5-nonylsulfonyl)aniline separates as an oily product and soon solidifies, weight 43 grams. The waxy product is dissolved in ether, treated with charcoal, and filtered. The solution is concentrated to a small volume whereupon the product separates and is collected by filtration and washed with petroleum ether to afford 33 g. of product, M.P. 90°–92° C. Further recrystallization from a mixture of ether-petroleum ether affords substantially pure 3-chloro-4-(5-nonylsulfonyl)aniline, M.P. 92°–94° C.

Elemental analysis for $C_{15}H_{24}ClNO_2S$.—Calc. (percent): C, 56.67; H, 7.61; N, 4.41. Found (percent): C, 56.90; H, 7.48; N, 4.38.

Step D: 3-chloro - 4-(5-nonylsulfonyl)benzenesulfonyl chloride.—3-chloro - 4 - (4-nonylsulfonyl)aniline is suspended in a mixture of concentrated hydrochloric acid (40 ml.) and acetic acid (40 ml.). The reaction mixture is cooled to below 5° C. and stirred while a solution of sodium nitrite (4.2 g., 0.06 mole), in water (10 ml.), is slowly added dropwise while maintaining the temperature below 5° C. The orange suspension is stirred for an additional 15 minutes. This solution is added to a second solution prepared by dissolving sulfur dioxide (25 g.) in acetic acid (35 ml.) to which is added a solution of cupric chloride (4 g.) in water (10 ml.) has been added. The reaction mixture is allowed to stand 3 hours whereupon 3-chloro-4-(5-nonylsulfonyl)benzenesulfonyl chloride separates as an oil.

Step E: 3-chloro - 4 - (5-nonylsulfonyl)benzenesulfonamide.—To an ammonium hydroxide solution (28% 150 ml.), in an ice bath, is added 3-chloro-4-(5-nonylsulfonyl)benzenesulfonyl chloride. The reaction mixture is allowed to stand overnight at room temperature. The product is collected by filtration and recrystallized from a mixture of ether-petroleum ether to afford 6.8 g. of 3-chloro-4-(5-nonylsulfonyl)benzenesulfonamide, M.P. 123°–125° C.

Elemental analysis for $C_{15}H_{24}ClNO_4S_2$.—Calc. (percent): C, 47.17; H, 6.34; N, 3.67. Found (percent): C, 46.32; H, 6.10; N, 3.58.

Step F: N-acetyl - 3 - chloro-4-(5-nonylsulfonyl)benzenesulfonamide.—To a suspension of sodium hydride (1.0 g., 0.02 mole) in benzene (100 ml.) is added 3-chloro-4-(5-nonylsulfonyl)benzenesulfonamide. The reaction mixture is heated under reflux, with stirring, for 15 minutes whereupon a gelatinous precipitate is formed. Acetyl chloride (1.6 g., 0.02 mole) is slowly added dropwise and the reaction mixture again heated under reflux for one hour. The solvent is removed and the residue dissolved in a saturated sodium bicarbonate solution. The sodium bicarbonate solution is washed with ether and acidified with dilute hydrochloric acid to afford N-acetyl-3 - chloro-4-(5 - nonylsulfonyl)benzenesulfonamide. Recrystallization from a mixture of ether and petroleum ether affords 3.0 g. of substantially pure product, M.P. 113°–115° C.

Elemental analysis for $C_{17}H_{26}ClNO_5S_2$.—Calc. (percent): C, 48.16; H, 6.18; N, 3.30. Found (percent): C, 48.60; H, 6.32; N, 3.32.

EXAMPLE 4

N-acetyl-3-chloro-4-(5-nonylsulfonyl)benzenesulfonamide

3 - chloro - 4 - (5 - nonylsulfonyl)benzenesulfonamide (5.0 g.) is suspended in acetic anhydride (10 ml.). To this is added 2 drops of concentrated sulfuric acid. The reaction mixture is heated for 1 hour on the steam bath and then added to ice water (50 ml.). The solid product is collected and air dried. Recrystallization from a mixture of ether and petroleum ether yields substantially pure N - acetyl - 3 - chloro - 4 - (5 - nonylsulfonyl)benzenesulfonamide, M.P. 113°–115° C.

EXAMPLE 5

N-acetyl-3-trifluoromethyl-4-(5-nonylsulfonyl)benzenesulfonamide

Step A: 4 - acetamido - 2 - trifluoromethylthiophenol.—By substituting for the N-acetylsulfanilyl chloride of Example 1, Step B, an equimolar quantity of N-acetyl-2-trifluoromethylsulfanilyl chloride and by following substantially the procedure described therein, there is obtained 4-acetamido-2-trifluoromethylthiophenol.

Step B: 3 - trifluoromethyl - 4 - (5 - nonylthio)acetanilide.— By substituting for the 4-acetamido-2-chlorothiophenol of Example 3, Step A, an equimolar quantity of 4-acetamido-2-trifluoromethylthiophenol and by following substantially the procedure described therein, there is obtained 3-trifluoromethyl-4-(5-nonylthio)acetanilide.

Step C: 3 - trifluoromethyl - 4 - (5 - nonylsulfonyl)acetanilide.—By substituting for the 3-chloro-4-(5-nonylthio)acetanilide of Example 3, Step B, an equimolar quantity of 3-trifluoromethyl-4-(5-nonylthio)acetanilide and by following substantially the procedure described therein, there is obtained 3-trifluoromethyl-4-(5-nonylsulfonyl)acetanilide.

Step D: 3 - trifluoromethyl - 4 - (5 - nonylsulfonyl)aniline.—By substituting for the 3-chloro-4-(5-nonylsulfonyl)acetanilide of Example 3, Step C, an equimolar quantity of 3 - trifluoromethyl - 4 - (5 - nonylsulfonyl)acetanilide and by following substantially the procedure described therein, there is obtained 3-trifluoromethyl-4-(5-nonylsulfonyl)aniline.

Step E: 3 - trifluoromethyl - 4 - (5 - nonylsulfonyl)benzenesulfonyl chloride.—By substituting for the 3-chloro-4-(5-nonylsulfonyl)aniline of Example 3, Step D, an equimolar quantity of 3-trifluoromethyl-4-(5-nonylsulfonyl)aniline and by following substantially the procedure described therein, there is obtainel 3-trifluoromethyl-4-(5-nonylsulfonyl)benzenesulfonyl chloride.

Step F: 3 - trifluoromethyl - 4 - (5 - nonylsulfonyl)benzenesulfonamide.—By substituting for the 3-chloro-4-(5-nonylsulfonyl)benzenesulfonyl chloride of Example 3, Step E, an equimolar quantity of 3-trifluoromethyl-4-(5-nonylsulfonyl)benzenesulfonyl chloride and by following stantially the procedure described therein, there is obtained 3 - trifluoromethyl - 4 - (5 - nonylsulfonyl)benzenesulfonamide.

Step G: N-acetyl-3-trifluoromethyl-4-(5-nonylsulfonyl)benzenesulfonamide.—By substituting for the 3-chloro-4-(5-nonylsulfonyl)benzenesulfonamide of Example 3, Step F, an equimolar quantity of 3-trifluoromethyl-4-(5-nonylsulfonyl)benzenesulfononamide and by following substantially the procedure described therein, there is obtained N - acetyl - 3 - trifluoromethyl - 4 - (5 - nonylsulfonyl)benzenesulfonamide.

EXAMPLE 6

3 - chloro - 4 - (5 - nonylsulfonyl) - N - methanesulfonylbenzenesulfonamide.—To a solution of 3-chloro-4-(5-nonylsulfonyl)benzenesulfonamide (0.1 mole) in benzene (100 ml.) and pyridine (10 ml.) at 25° C. is added methanesulfonyl chloride (0.1 mole). The reaction mixture is refluxed for one hour on a steam bath and the solvent removed at reduced pressure to yield 3-chloro-4-(5 - nonylsulfonyl) - N - methanesulfonylbenzenesulfonamide.

EXAMPLE 7

3 - trifluoromethyl - 4 - (5 - nonylsulfonyl) - N - methanesulfonylbenzenesulfonamide.—3 - trifluoromethyl - 4-(5 - nonylsulfonyl)benzenesulfonamide (0.1 mole) is suspended in methanesulfonic acid anhydride (0.1 mole). Two drops of concentrated sulfuric acid is added and the reaction mixture is heated for one hour on a steam bath. The reaction mixture is cooled and extracted with ether. The ether solution is washed with water and dried over anhydrous magnesium sulfate. The ether solution is filtered and the ether removed to yield 3-trifluoromethyl-4-(5 - nonylsulfonyl) - N - methanesulfonylbenzenesulfonamide.

EXAMPLE 8

N-acetyl-2-(4-heptylsulfonyl)benzenesulfonamide

Step A: 2-(4-heptylthio)acetanilide.—By substituting for the 4-acetamidothiophenol of Example 1, Step C, an equimolar quantity of 2-acetamidothiophenol and by following substantially the procedure described therein, there is obtained 2-(4-heptylthio)acetanilide.

Step B: 2-(4-heptylsulfonyl)acetanilide.—By substituting for the 4-(4-heptylthio)acetanilide of Example 1, Step D, an equimolar quantity of 2-(4-heptylthio)acetanilide and by following substantially the procedure described therein, there is obtained 2-(4-heptylsulfonyl)acetanilide.

Step C: 2-(4-heptylsulfonyl)aniline.— By substituting for the 4-(4-heptylsulfonyl)acetanilide of Example 1, Step E, an equimolar quantity of 2-(4-heptylsulfonyl)acetanilide and by following substantially the procedure described therein, there is obtained 2-(4-heptylsulfonyl)aniline.

Step D: 2-(4-heptylsulfonyl)benzenesulfonyl chloride.—By substituting for the 4-(4-heptylsulfonyl)aniline of Example 1, Step F, an equimolar quantity of 2-(4-heptylsulfonyl)aniline and by following substantially the procedure described therein, there is obtained 2-(4-heptylsulfonyl)benzenesulfonyl chloride.

Step E: 2-(4-heptylsulfonyl)benzenesulfonamide.—By substituting for the 4-(4-heptylsulfonyl)benzenesulfonyl chloride of Example 1, Step G, an equimolar quantity of 2-(4-heptylsulfonyl)benzenesulfonyl chloride and by following substantially the procedure described therein, there is obtained 2-(4-heptylsulfonyl)benzenesulfonamide.

Step F: N - acetyl-2-(4-heptylsulfonyl)benzenesulfonamide.—By substituting for the 4-(4-heptylsulfonyl)benzenesulfonamile of Example 1, Step H, an equimolar quantity of 2-(4-heptylsulfonyl)benzenesulfonamide and by following substantially the procedure described therein, there is obtained N-acetyl-2-(4-heptlysulfonyl)benzenesulfonamide.

EXAMPLE 9

N-acetyl-4-chloro-3-(4-heptylsulfonyl)benzenesulfonamide

Step A: 4-chloro - 3 - (4-heptylthio)acetanilide.—By substituting for the 4 - acetamidothiophenol of Example 1, Step C, an equimolar quantity of 3 - acetamido-4-chlorothiophenol and by following substantially the procedure described therein, there is obtained 4-chloro-3-(4-heptylthio)acetanilide.

Step B: 4-chloro - 3 - (4-heptylsulfonyl)acetanilide.— By substituting for the 4-(4 - heptylthio)acetanilide of Example 1, Step D, an equimolar quantity of 4-chloro-3-(4-heptylthio)acetanilide and by following substantially the procedure described therein, there is obtained 4-chloro-3-(4-heptylsulfonyl)acetanilide.

Step C: 4-chloro - 3 - (4-heptylsulfonyl)aniline.—By substituting for the 4 - (4-heptylsulfonyl)acetanilide of Example 1, Step E, an equimolar quantity of 4-chloro-3-(4-heptylsulfonyl)acetanilide and by following substantially the procedure described therein, there is obtained 4-chloro-3-(4-heptylsulfonyl)aniline.

Step D: 4-chloro - 3 - (4-heptylsulfonyl)benzenesulfonyl chloride.—By substituting for the 4 - (4 - heptylsulfonyl)aniline of Example 1, Step F, an equimolar quantity of 4-chloro - 3 - (4-heptylsulfonyl)aniline and by following substantially the procedure described therein, there is obtained 4-chloro - 3 - (4-heptylsulfonyl)benzenesulfonyl chloride.

Step E: 4-chloro - 3 - (4-heptylsulfonyl)benzenesulfonamide.—By substituting for the 4 - (4 - heptylsulfonyl)benzenesulfonyl chloride of Example 1, Step G, an equimolar quantity of 4-chloro - 3 - (4-heptylsulfonyl)benzenesulfonyl chloride and by following substantially the procedure described therein, there is obtained 4-chloro-3-(4-heptylsulfonyl)benzenesulfonamide.

Step F: N-acetyl - 4 - chloro - 3 - (4-heptylsulfonyl)benzenesulfonamide.—By substituting for the 4-(4-heptylsulfonyl)benzenesulfonamide of Example 1, Step H, an equimolar quantity of 4-chloro - 3 - (4-heptylsulfonyl)benzenesulfonamide and by following substantially the procedure described therein, there is obtained N-acetyl-4-chloro-3-(4-heptylsulfonyl)benzenesulfonamide.

In a manner similar to that described in Example 1 for the preparation of N-acetyl - 4 - (4-heptylsulfonyl)benzenesulfonamide, all of the N-acyl sulfonylbenzenesulfonamides of this invention may be obtained. Thus, by substituting the appropriately substituted acetanilide for the acetanilide of Example 1, Step A, and following substantially the procedure described in Steps A through H of that example, the N-acyl sulfonylbenzenesulfonamides of this invention may be obtained. The following equation illustrates the reaction of Example 1, Steps A through H, and, taken together with Table I, infra, depict the starting materials, intermediate derivatives and N-acyl sulfonylbenzenesulfonamide products obtained thereby:

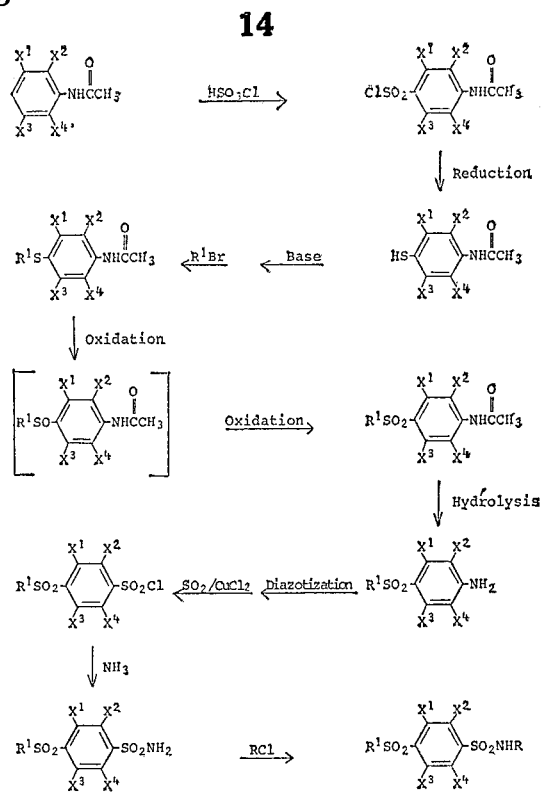

TABLE I

| Ex. No. | R | $R^1$ | $X^1$ | $X^2$ | $X^3$ | $X^4$ |
|---|---|---|---|---|---|---|
| 10 | —C(O)—C₆H₅ (phenyl) | —CH₂CH₃ | F | H | H | H |
| 11 | —C(O)—furyl (O) | —(CH₂)₂CH₃ | —CH₃ | H | H | H |
| 12 | —C(O)—pyridyl (N) | —(CH₂)₃CH₃ | —NO₂ | H | H | H |
| 13 | —C(O)—pyrrolidinyl (NH) | —(CH₂)₄CH₃ | —COOH | H | H | H |
| 14 | —C(O)—piperidinyl (NH) | —(CH₂)₅CH₃ | —CH=CH—CH=CH— | H | H |
| 15 | —C(O)—CH₂—furyl (O) | thiophene (S) |  | —CH₂CH₂CH₂CH₂— | H | H |
| 16 | —C(O)—CH₃ | thiophene (S) |  | —CH₂CH₂CH₂— | H | H |
| 17 | —C(O)—CH₂—C₆H₅ | phenyl | —CH₂CH=CHCH₃ | Cl | H | H | H |

TABLE I—Continued

| Ex. No. | R | R¹ | X¹ | X² | X³ | X⁴ |
|---|---|---|---|---|---|---|
| 18 | $-\overset{O}{\underset{\|}{C}}-CH_3$ | $-CH_2C{\equiv}CCH_3$ | Cl | H | H | H |
| 19 | $-\overset{O}{\underset{\|}{C}}-CH{\overset{CH_3}{\underset{CH_3}{\diagdown}}}$ | furfuryl (2-furylmethyl) | $-CH_3$ | $-CH_3$ | $-CH_3$ | H |
| 20 | $-\overset{O}{\underset{\|}{C}}-(CH_2)_3CH_3$ | pyrrol-2-ylmethyl (NH) | Cl | Cl | H | H |
| 21 | $-\overset{O}{\underset{\|}{C}}-CH_3$ | pyridin-2-ylmethyl | H | H | H | H |
| 22 | $-\overset{O}{\underset{\|}{C}}-CH_3$ | thien-2-ylmethyl | Cl | H | H | H |
| 23 | $-\overset{O}{\underset{\|}{C}}-CH_2-\text{pyridin-2-yl}$ | $-CH(n\text{-}C_4H_9)_2$ | Cl | Cl | Cl | Cl |
| 24 | $-\overset{O}{\underset{\|}{C}}-CH_2-\text{phenyl}$ | $-CH(n\text{-}C_4H_9)_2$ | $-CH_3$ | $-CH_3$ | H | H |
| 25 | $-\overset{O}{\underset{\|}{C}}-CH_2-\text{pyridin-2-yl}$ | $-CH(n\text{-}C_4H_9)_2$ | Cl | Cl | H | H |
| 26 | $-\overset{O}{\underset{\|}{C}}-\text{thien-2-yl}$ | $-CH(n\text{-}C_4H_9)_2$ | Cl | Cl | H | H |

The novel compounds of this invention are uricosuric agents which can be administered in a wide variety of therapeutic dosages in conventional vehicles as, for example, by oral administration in the form of a tablet or by intravenous injection. Also, the daily dosage of the products may be varied over a wide range as, for example, in the form of scored tablets containing 5, 10, 25, 50, 100, 150, 250 and 500 milligrams of the active ingredient for the symptomatic adjustment of the dosage to the patient to be treated. These dosages are well below the toxic or lethal dose of the products which may be administered in a total daily dosage of from 100 mg. to 2,000 mg. in a pharmaceutically acceptable carrier.

A suitable unit dosage form of the products of this invention can be administered by mixing 50 milligrams of N-acetyl-3-chloro-4-(5-nonylsulfonyl)benzenesulfonamide or a suitable salt with 149 mg. of lactose and 1 mg. of magnesium stearate and placing the 200 mg. mixture into a No. 2 gelatin capsule. Similarly, by employing more of the active ingredient and less lactose, other dosage forms can be put up in No. 2 gelatin capsules and, should it be necessary to mix more than 200 mg. of ingredients together, larger capsules may be employed. Compressed tablets, pills, or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds of this invention with other known uricosurics or with other desired therapeutic and/or nutritive agents in dosage unit form.

The following example is included to illustrate the preparation of a representative dosage form:

EXAMPLE 27

Dry-filled capsules containing 50 mg. of active ingredient per capsule

|  | Per capsule, mg. |
|---|---|
| N-acetyl - 3 - chloro - 4 - (5-nonylsulfonyl)benzenesulfonamide | 50 |
| Lactose | 149 |
| Magnesium stearate | 1 |
| Capsule (Size No. 1) | 200 |

The N-acetyl - 3 - chloro - 4 - (5-nonylsulfonyl)benzenesulfonamide is reduced to a No. 60 powder and then lactose and magnesium stearate are passed through a No. 60 bolting cloth onto the powder and the combined ingredients admixed for 10 minutes and then filled into a No. 1 dry gelatin capsule.

Similar dry-filled capsules can be prepared by replacing this active ingredient of the above example by any of the other novel compounds of this invention.

It will be apparent from the foregoing description that the nuclear sulfonyl substituted N-acyl (and N-organosulfonyl)benzenesulfonamide products (I) of this invention constitute a valuable class of compounds which have not been prepared heretofore. One skilled in the art will also appreciate the processes disclosed in the above examples are merely illustrative and are capable of a wide variation and modification without departing from the spirit of this invention.

What is claimed is:
1. A compound of this formula:

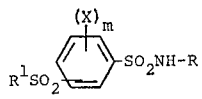

wherein R is lower alkanoyl, cycloalkylcarbonyl containing from 5–6 nuclear carbon atoms, mononuclear cycloalkyl lower alkanoyl containing 5–6 nuclear carbon atoms, lower alkenoyl, lower alkynoyl, benzoyl and phenylacetyl, $R^1$ is alkyl containing from two to nine carbon atoms, mononuclear lower cycloalkyl containing from 5 to 6 nuclear carbon atoms, lower alkenyl and lower alkynyl; X is halo, lower alkyl, nitro, trihalomethyl or carboxy or, taken together, two X radicals on adjacent carbon atoms of the benzene ring may be joined to form a hydrocarbylene chain containing from 3 to 4 carbon atoms between their points of attachment, and $m$ is an integer having a value of 0–4; or a non-toxic, pharmaceutically acceptable salt thereof.

2. A compound of the formula:

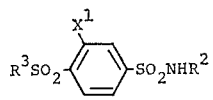

wherein $R^2$ is lower alkanoyl; $R^3$ is alkyl containing from 7 to 9 carbon atoms and $X^1$ is hydrogen or halo or a non-toxic, pharmaceutically acceptable salt thereof.

3. A compound according to claim 2 wherein $X^1$ is halo.
4. A compound according to claim 2 wherein $X^1$ is hydrogen.
5. A compound according to claim 3 wherein $R^2$ is acetyl; $R^3$ is 4-heptyl and $X^1$ is chloro.
6. A compound according to claim 3 wherein $R^2$ is acetyl; $R^3$ is 5-nonyl and $X^1$ is chloro.
7. A compound according to claim 4 wherein $R^2$ is acetyl; $R^3$ is 4-heptyl and $X^1$ is hydrogen.

References Cited
UNITED STATES PATENTS
3,560,563    2/1971    Childress et al. ____ 260—556 AC FOREIGN PATENTS
680,155    10/1952    Great Britain ____ 260—556 AC OTHER REFERENCES
J. Org. Chem. 26: 1551–1553 (1961), Blank et al.

HENRY R. JILES, Primary Examiner
S. D. WINTERS, Assistant Examiner

U.S. Cl. X.R.
260—518 R, 556 SN, 347.2, 326.3, 294.8 F, 293.73, 332.2 C, 332.2 R, 247.1, 556 AR, 556 C, 543 F, 543 R 141, 562 R; 424—321, 317, 285, 274, 263, 267, 275